United States Patent
Salvador et al.

(10) Patent No.: US 6,448,978 B1
(45) Date of Patent: *Sep. 10, 2002

(54) MECHANISM FOR INCREASING AWARENESS AND SENSE OF PROXIMITY AMONG MULTIPLE USERS IN A NETWORK SYSTEM

(75) Inventors: Anthony C. Salvador, Portland; Rune A. Skarbo, Hillsboro; Christopher C. Lawless, Forest Grove; Frederick J. Cooper; Kathleen E. Kovatch, both of Portland; Douglas L. Sorenson, Hillsboro, all of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/725,215

(22) Filed: Sep. 26, 1996

(51) Int. Cl.$^7$ ............................................. G06F 13/00
(52) U.S. Cl. ..................... 345/741; 345/751; 709/204
(58) Field of Search ................................. 345/329, 330, 345/331, 326, 333, 335, 700, 733, 741–744, 751, 753, 756, 758, 759; 709/203, 204

(56) References Cited

U.S. PATENT DOCUMENTS

| | | | | |
|---|---|---|---|---|
| 4,974,173 A | * | 11/1990 | Stefik et al. ................. 345/751 |
| 5,471,616 A | * | 11/1995 | Johnson et al. ............. 713/200 |
| 5,793,365 A | * | 8/1998 | Tang et al. ................. 345/758 |
| 5,812,865 A | * | 9/1998 | Theimer et al. ............ 709/228 |
| 5,819,084 A | * | 10/1998 | Shapiro et al. ............. 707/10 |
| 5,880,731 A | * | 3/1999 | Liles et al. ................. 345/758 |
| 5,892,856 A | * | 4/1999 | Cooper et al. ............. 382/291 |
| 5,960,173 A | * | 9/1999 | Tang et al. ................. 709/201 |
| 6,108,704 A | * | 8/2000 | Hutton et al. ............. 709/227 |
| 6,148,328 A | * | 11/2000 | Cuomo et al. ............. 709/204 |

OTHER PUBLICATIONS

Morabito, "Enter the On–Line World of Lucasfilm", RUN, pp. 24–28, Aug. 1986.*
"Welcome to Club Caribe– Club Caribe Handbook", Quantum Computer Services, Inc., pp. 1–11, 1989.*
Fukuda et al., "Hypermedia Personal Computer Communication System: Fujitsu Habitat", Fujitsu Sci. Tech. J., pp. 197–205, Oct. 1990.*
Carlsson et al., "Dive– a Multi–User Virtual Reality System", IEEE Virtual Reality Annual International Symposium, pp. 394–400, Sep. 1993.*
Benford et al., "Supporting Cooperative Work in Virtual Environments", The Computer Journal, vol. 37, No. 8, pp. 653–667, 1994.*
Gajewska et al., "Pssst: Side Conversations in the Argo Telecollaboration System", User Interface Software and Technology Symposium, pp. 155–156, Nov. 1995.*
Gajewska et al., "Argohalls: Adding Support for Group Awareness to the Argo Telecollaboration System", User Interface Software and Technology Symposium, pp. 157–158, Nov. 1995.*

* cited by examiner

Primary Examiner—Crescelle N. dela Torre
(74) Attorney, Agent, or Firm—Blakely, Sokoloff, Taylor & Zafman LLP

(57) ABSTRACT

A mechanism for increasing awareness and sense of proximity among multiple users in a network system senses whether a first user is in close proximity to a first end point. The mechanism then transmits first proximity information indicating whether the first user is in close proximity to the first end point from the first end point to a second end point.

12 Claims, 8 Drawing Sheets

MECHANISM FOR INCREASING AWARENESS AND SENSE OF PROXIMITY AMONG MULTIPLE USERS IN A NETWORK SYSTEM

BACKGROUND OF THE INVENTION

1. Field of the Invention

The present invention pertains to communication between multiple individuals. More particularly, this invention relates to increasing awareness and sense of proximity among multiple users.

2. Background

In the modern business world, multiple individuals typically work together as a team to obtain a particular goal. These particular goals vary greatly, being dependent on the nature of the individuals' company. The physical localities of each of the team members can also vary. For example, different team members may be located in different offices on the same floor, in different buildings, at different sites throughout the world, or any combination of these possible locations.

One problem which can arise with teamwork is the lack of physical proximity of the individual team members. Having multiple team members distributed throughout different locations reduces the sense of awareness of and proximity to different team members. This situation arises whenever there is a physical separation of team members, regardless of whether they are across the country or down the hall from each other. However, a sense of awareness and proximity, as well as ease of communication, typically enhances the team environment. Thus, it would be beneficial to provide a mechanism to increase awareness of and sense of proximity to multiple individuals separated over different physical distances.

A specific example of physical distance between team members is the increasing use of remote computing. Some individuals currently spend a portion of their work week working at home. These individuals often remotely access their office network from home (for example, via a modem and telephone line). Given that these individuals may still be part of a team, it would be beneficial to provide a mechanism to increase the sense of proximity and awareness of all the team members, including both those individuals who are working from home and those who are working in the office.

Additionally, communication between multiple individuals, such as members of a team, is often more difficult over greater distances. For example, it is typically easier for an individual to know when the person at the desk next to theirs is at his desk and when he can be talked to rather than someone on another floor of the building. Current solutions to knowing whether a person is present in his or her office include both using a telephone to call the person and walking to that person's desk to see if he or she is there. However, these solutions present additional problems. For example, if a person is not present at his or her desk or is on the phone, the phone may be forwarded to a voice mail system, many of which do not inform the caller whether the person is at his or her desk and on the phone, or away from his desk. Additionally, walking to the person's desk results in wasted time if the individual is not there. Thus, it would be beneficial to provide a mechanism to augment opportune communication between multiple individuals.

Furthermore, given that individuals may frequently enter and leave their offices throughout the work day, it would be beneficial to provide a mechanism to automatically and accurately sense the presence or absence of an individual.

As will be described in more detail below, the present invention provides a mechanism for increasing awareness and sense of proximity among multiple individuals which will be apparent to those skilled in the art from the description that follows.

SUMMARY OF THE INVENTION

A mechanism for increasing awareness and sense of proximity among multiple users in a network system is described herein. The mechanism senses whether a first user is in close proximity to a first end point. The mechanism then transmits first proximity information indicating whether the first user is in close proximity to the first end point from the first end point to a second end point.

According to one embodiment, the first end point determines whether the first user is in close proximity to the first end point based on one or more of a variety of sensors, including a cursor control sensor, a keyboard sensor, and a motion sensor. This proximity information can then be displayed or otherwise communicated to the user(s) of one or more additional end points, providing the user(s) of the additional end points with information regarding whether the first user is in close proximity to the first end point.

DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is to be appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention provides a mechanism for increasing awareness and sense of proximity among multiple users in a network system. Messages can be transferred between two or more end points, allowing the user of an end point to obtain information regarding the proximity of another user to that other user's end point. The present invention provides an additional sense of awareness and proximity to multiple users by letting the users know when other users are in close proximity to their end points.

Figure 1:
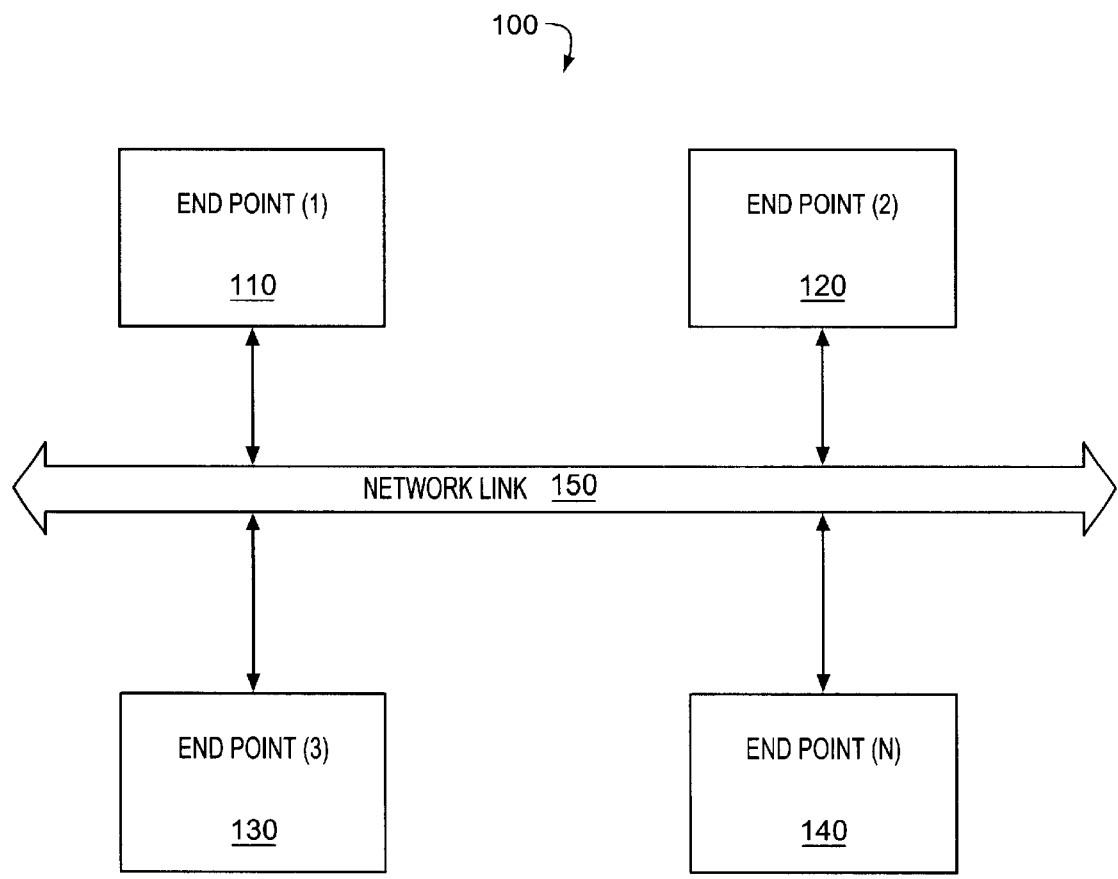
FIG. 1 illustrates a network environment such as may be used with one embodiment of the present invention.

FIG. 1 illustrates a network environment such as may be used with one embodiment of the present invention. Network environment 100 includes multiple (N) end points: an end point 110, an end point 120, an end point 130, and an end point 140. Each of the end points 110–140 are coupled together via a network link 150. Network link 150 can be any combination of any one or more of a wide variety of conventional networks, such as a local area network (LAN), the Internet, the World Wide Web, an Intranet, etc.

The connections between network link 150 and end points 110–140, as well as network link 150 itself, can be any of a wide variety of conventional communication media. For example, the communication media include Ethernet cable, an Integrated Services Device Network (ISDN) line, a plain old telephone system (POTS) line, a fiber optic line, etc. Additionally, the communication media can be a wireless communication medium, such as signals propagating in the infrared or radio frequencies. Furthermore, the communication media can be a combination of communication media and can include converting devices for changing the form of the signal based on the communication media being used.

Each of the end points 110–140 can be coupled to network link 150 in any of a wide variety of conventional manners. Any type of a conventional gateway or other connection can be used by end points 110–140 which provides a continual open communication link between the end point and network link 150.

In one embodiment of the present invention, each end point 110–140 is coupled to a video camera. In one implementation, the video cameras coupled to end points 110–140 are part of a ProShare™ Personal Conferencing system, available from Intel Corporation of Santa Clara, Calif. The video camera at an end point provides a visual representation of the user of that end point, thereby allowing each conference participant to see the other participants, even though they may be separated by great distances. The use of a video camera with the present invention is discussed in more detail below.

Figure 2:
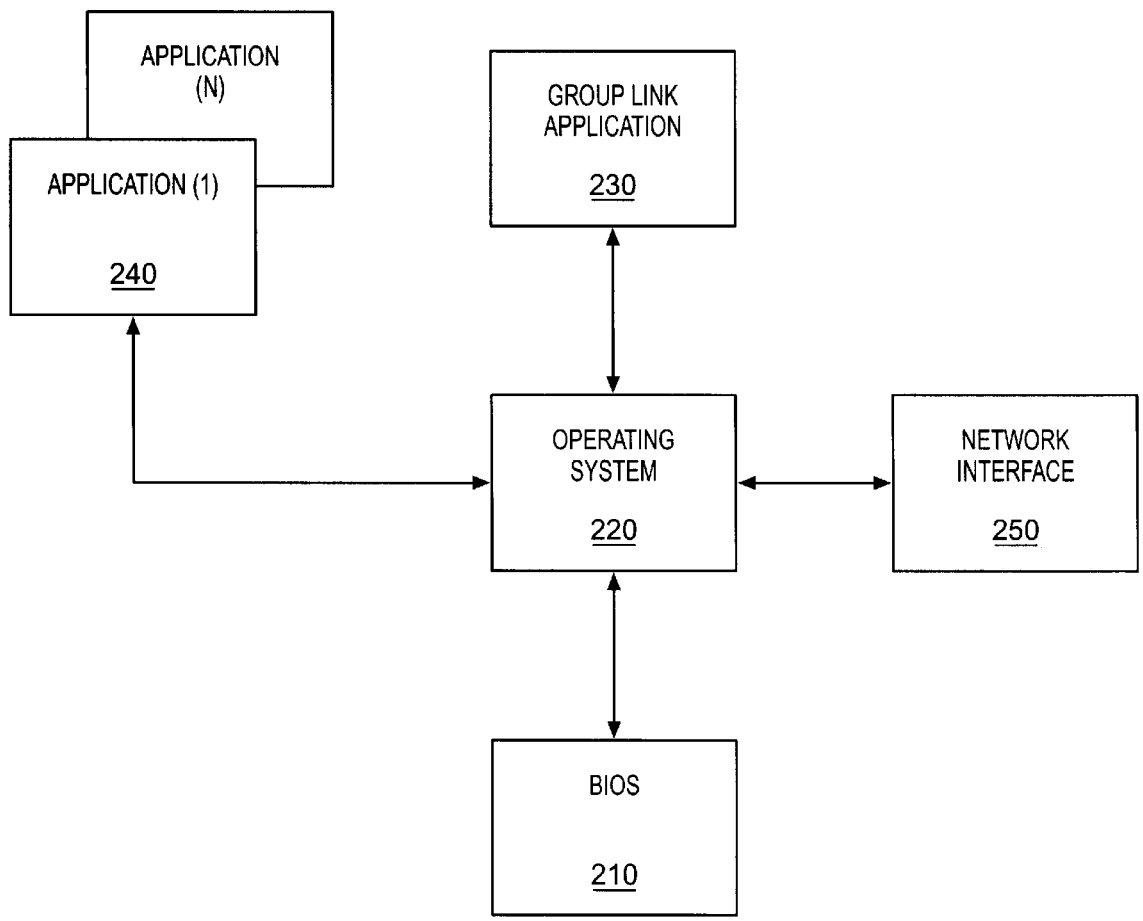
FIG. 2 is a simplified block diagram illustrating the system architecture of an end point such as may be used with one embodiment of the present invention.

FIG. 2 is a simplified block diagram illustrating the system architecture of an end point such as may be used with one embodiment of the present invention. As shown, the end point includes a basic input/output system (BIOS) 210, an operating system 220, a group link application 230, and a network interface 250. BIOS 210 provides an interface between operating system 220 and the various input/output (I/O) devices coupled to the system.

Operating system 220 is a software application which provides an interface between BIOS 210 and software applications 240 running on the end point. Operating system 220 provides an interface, such as a graphical user interface (GUI), between the user and the end point. According to one embodiment of the present invention, operating system 220 is the Windows™ 95 operating system, available from Microsoft Corporation of Redmond, Wash. However, it is to be appreciated that the present invention may be used with any other conventional operating system, such as other versions of Microsoft Windows™ (for example, Windows™ 3.0, Windows™ 3.1, or Windows™ NT), Microsoft DOS, OS/2, available from International Business Machines Corporation of Armonk, N.Y., or the Apple Macintosh Operating System, available from Apple Computer Incorporated of Cupertino, Calif.

In one embodiment of the present invention, group link application 230 provides the increased awareness and sense of proximity among multiple users of the present invention. Group link application 230 interacts with network interface 250 to communicate with different end points, as discussed in more detail below.

Network interface 250 provides an interface to a network for the end point to communicate with other end points, such as network link 150 of FIG. 1. In one embodiment of the present invention, network interface 250 supports the Transmission Control Protocol/Internet Protocol (TCP/IP) protocol. By way of example, network interface 250 may be a Windows Sockets 1.1 interface, as defined in the Windows Sockets Interface Specification, Version 1.1, dated Jan. 20, 1993, or a Windows Sockets 2 interface, as defined in the Windows Sockets 2 Service Provider Interface Specification, Revision 2.2.0, dated May 10, 1996, the Windows Sockets 2 Application Programming Interface, Revision 2.2.0, dated May 10, 1996, and the Windows Sockets 2 Protocol-Specific Annex, Revision 2.0.3, dated May 10, 1996. However, it is to be appreciated that network interface 250 can be any conventional interface which allows communication between a network and an operating system.

In the following discussions, reference is made to "observer" end points and "observee" end points. An end point which is monitoring information from a second end point to determine the proximity of a user to the second end point is referred to as the "observer" end point. An end point which is providing information regarding the proximity of the user to the end point to another end point(s) is referred to as the "observee" end point. It is to be appreciated that a particular end point can be both an observer end point and an observee end point.

Figure 3:
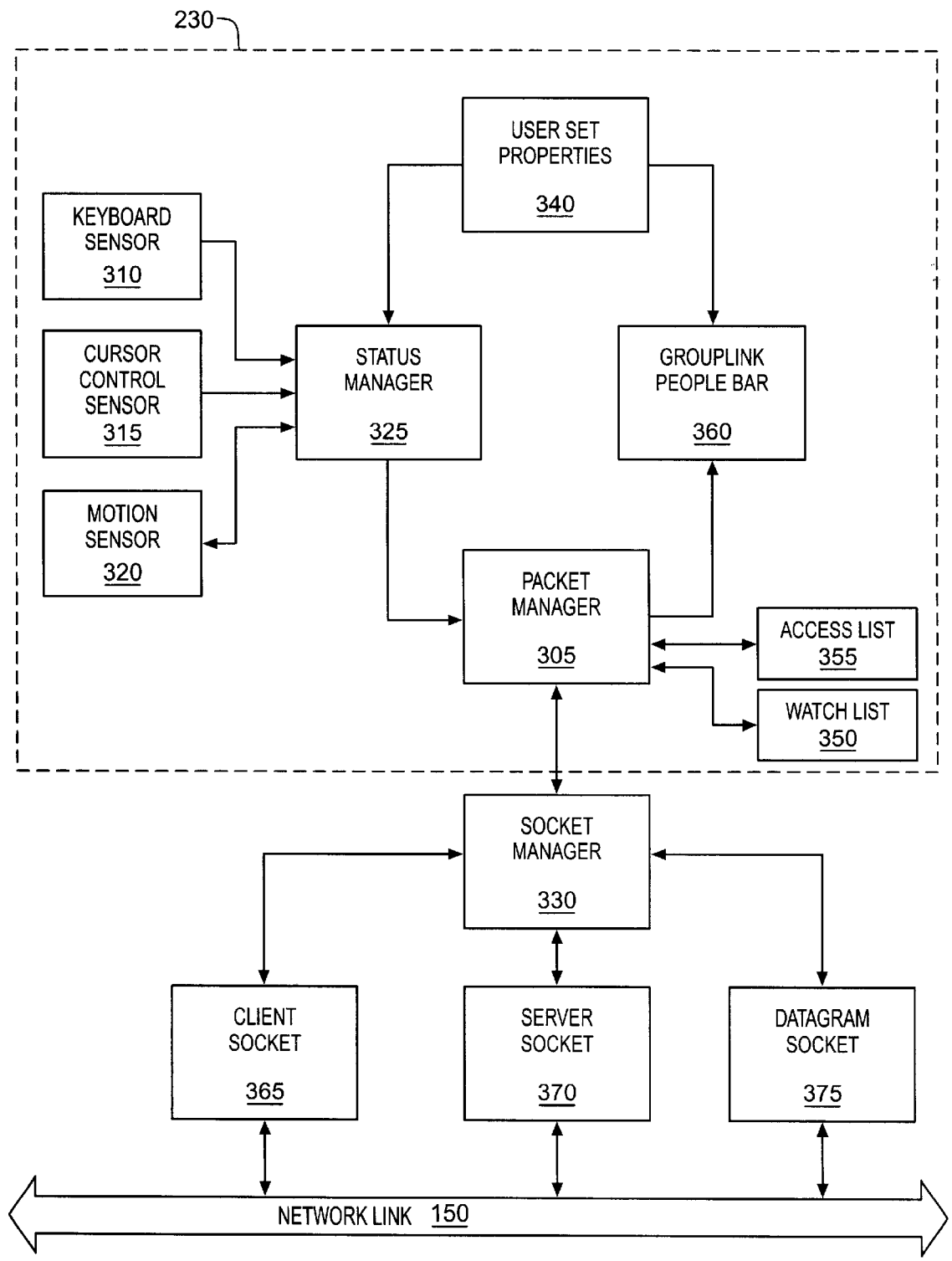
FIG. 3 is a block diagram illustrating the architecture of one embodiment of the present invention.

FIG. 3 is a block diagram illustrating the architecture of one embodiment of the present invention. Two or more end points in a network system can interact with one another by each executing group link application 230. With each of the multiple end points executing group link application 230, the end points can communicate user proximity information to one another. This user proximity information indicates the proximity of the individual users to their respective end points.

The proximity information transferred from the observee end point to the observer end point can be any of a wide range of information. For example, the proximity information may be a simple "IN" or "OUT" indication, a pre-stored snapshot of the user if the user is in close proximity, a video snapshot from a video camera coupled to the user's end point, a video stream from a video camera coupled to the user's end point, etc.

Group link application 230 as illustrated includes a packet manager 305, a keyboard sensor 310, a cursor control sensor 315, a motion sensor 320, and a status manager 325 coupled together as shown. Additionally, group link application 230 also includes user set properties 340, grouplink people bar 360, a watch list 350 and an access lo list 355. Packet manager 305 interacts with the operating system on the end point as well as the other components of group link application 230 as discussed below. Also illustrated in FIG. 3 is a socket manager 330, client socket 365, server socket 370, datagram socket 375, and network link 150 coupled together as shown.

Watch list 350 is a data structure indicating all of the end points which the current end point is watching. In other words, an indication of observee end points which are being monitored by the current end point is maintained in watch list 350. Access list 355 is a data structure indicating all of the end points which can receive proximity information from the current end point. In other words, an indication of observer end points which can be given information regarding the proximity of a user to the current end point is maintained in access list 355. The watch list 350 and access list 355 can be implemented in any of a wide range of conventional manners, such as individual user names or TCP/IP addresses.

According to one embodiment of the present invention, access list 355 maintains a record of all end points which can have access to the proximity information of the user to the end point, which could include an indication that all end points have access to the proximity information. In an alternate embodiment, access list 355 maintains a record of all end points which cannot have access to the proximity information of the user to the end point.

User set properties 340 is a set of options which can be customized by the user of the end point. These options typically affect the type, nature, and timing of information provided to the observer end points, as discussed in more detail below. In accordance with one embodiment of the present invention, an individual can associate a particular name with a particular end point via user set properties 340. This name can then be transferred, along with proximity information from the end point, to other end points, thereby allowing the other end points to associate a particular name to the information received from a particular end point.

Group link application 230 also includes a keyboard sensor 310 and a cursor control sensor 315. Keyboard sensor 310 monitors the keyboard or other alphanumeric input device at the end point for user input. Similarly, cursor control sensor 315 monitors the cursor control device or other pointing device, such as a mouse, trackpad, etc. at the end point for user input, including clicking a button of and/or moving the cursor control device. Each of keyboard sensor 310 and cursor control sensor 315 provide a signal to status manager 325 whenever they sense any input by a user.

Group link application also includes a motion sensor 320. In one embodiment of the present invention, a video camera is coupled to each of the end points. The motion sensor monitors the video images received from the camera and provides a signal to status manager 325 if motion is detected.

Motion can be detected by motion sensor 320 in any of a wide variety of manners. According to one embodiment motion sensor 320 periodically takes snapshots and compares each snapshot to the previous snapshot. If there is a significant enough difference between the two snapshots, then motion is detected. Differences between two snapshots can be measured in any of a wide variety of conventional manners, such as by taking the convolution of the two snapshots. In one implementation, snapshots are taken once per second.

According to another embodiment, when receiving images from the video camera the end point samples video images at a particular rate (for example, thirty frames per second). The end point generates a key frame from the first sampled video image, and for subsequent samplings of the video image the end point generates a delta frame. Each delta frame indicates the differences between the currently sampled image and the image sampled for the previous key frame. By using delta frames, the end point can reduce transmission time for video images because only the differences between frames is transferred, rather than the entire frame. Eventually, the delta frames indicate sufficient difference from the previous key frame that a new key frame is generated. Motion sensor 320 monitors these delta frames and compares the difference indicated in the delta frame to a predetermined threshold. If the difference is greater than the predetermined threshold, then motion sensor 320 signals to the status manager that it has observed movement greater than the threshold.

Status manager 325 makes a determination of whether a user is in close proximity to the end point based on the inputs from keyboard sensor 310, cursor control sensor 315, and motion sensor 320. Status manager 325 associates keyboard activity, cursor control activity, and motion as indications of the presence of a user. For example, if status manager 325 receives an indication from keyboard sensor 310 that there are currently inputs from the keyboard, then status manager 325 determines that a user is in close proximity to the end point (e.g., the user at the end point is in his/her office or at his/her desk).

In one embodiment of the present invention, the timing used by status manager 325 in determining whether a user is in close proximity to the end point is customizable by the individual user. This value can be customized to an individual's preferences by storing different values in user set properties 340. For example, a user may indicate that five seconds of inactivity indicated by the motion sensor and/or two minutes of inactivity indicated by the keyboard sensor indicates the user is not in close proximity to the end point.

In one embodiment, status manager 325 includes certain timers to determine how long ago each of the types of activity were observed. For example, keyboard sensor 310 indicates to status manager 325 each time there is input from the keyboard. If there is no input from the keyboard for a predetermined period of time then status manager 325 presumes a user is not in close proximity to the end point, although this presumption can be overcome by input from other sources, such as cursor control sensor 315 or motion sensor 320. In one embodiment, this predetermined period of time is 30 seconds, but these timers can be changed by the user of an end point via user set properties 340 as discussed above.

In one embodiment of the present invention, motion sensor 320 is used as a secondary sensor and keyboard sensor 310 and cursor control sensor 315 are primary sensors. The two levels of sensors, primary and secondary, are established because the motion computation by motion sensor 320 typically requires substantially more computation than the keyboard or cursor control sensors. Therefore, in this embodiment, if status manager 325 determines that a user is in close proximity to the end point because of keyboard or cursor control activity, then there is no need to undergo the motion determination. However, if the keyboard and cursor control sensors 310 and 315 indicate that a user is not in close proximity, such as when an individual is at his or her desk but is not using the keyboard or cursor control device, then status manager 325 requests input from motion sensor 320. Thus, in this embodiment, the motion sensor 320 only takes snapshots after the keyboard and cursor control sensors 310 and 315 indicate that a user is not in close proximity.

In one embodiment of the present invention, the type of sensors to be used at an end point can be selected and changed by the user of that end point. For example, the user could select a combination of one or more of the keyboard sensor, cursor control sensor, or motion sensor. This selection is then stored in user set properties 340.

In another embodiment of the present invention, status manager 325 also determines a probability that an individual is in close proximity to the end point based on the inputs from sensors 310, 315 and 320. This probability can be calculated in any of a wide variety of conventional manners based on the inputs from sensors 310, 315, and 320. For example, sporadic input from the cursor control device would result in status manager 325 generating a lower probability than if there were continuous input from the keyboard. By way of another example, substantial differences between snapshots monitored by motion sensor 320 would result in status manager 325 generating a higher probability than if motion sensor 320 detected only minor differences. It is to be appreciated that the probability that a user is in close proximity of an end point will decrease as the time since the last input from a sensor device indicating that user was in close proximity to the end point increases.

Packet manager 305 also receives messages from other end points coupled to network link 150 regarding proximity of other users to their respective end points. When proximity information is received, packet manager 305 compares the source of the message to watch list 350. In one embodiment, this source is identified by a user identification in the message which identifies the user of another end point, such as by name. If the identified user is in watch list 350, then packet manager 305 provides an indication to the user of the end point, via grouplink people bar 360, as to whether the identified user is in close proximity to his or her end point.

In an alternate embodiment of the present invention, proximity information is periodically broadcast to the other end points, rather than broadcasting only when there is a change as discussed above. In this embodiment, a broadcast timer is used to indicate when proximity information is to be broadcast to the other end points. Typical values for the broadcast timer range from five seconds to sixty seconds. However, it is to be appreciated that the broadcast timer could be set for any of a wide range of values. According to one embodiment, the broadcast timer can be determined empirically to be a short enough interval to provide accurate information regarding the proximity of the user to the end point, yet not so short so as to overburden the end point or network link. Additionally, the broadcast timer may be a programmable timer, the value of which can be changed by a user via user set properties 340.

Grouplink application 230 also includes grouplink people bar 360. Grouplink people bar 360 provides a display of users being watched, based on watch list 350, and various information associated with those individuals to the user of the end point. An example of a display is discussed in more detail below with reference to FIGS. 7a and 7b. Grouplink people bar 360 receives, from packet manager 305, proximity information updates regarding users being watched. Additionally, the information to be displayed by grouplink people bar 360 is received from user set properties 340, as discussed in more detail below.

A socket manager 330, client socket 365, server socket 370, and datagram socket 375 are also illustrated in FIG. 3. In one embodiment, socket manager 330, client socket 365, server socket 370, and datagram socket 375 are part of network interface 250 of FIG. 2. Socket manager 330 manages the receipt and transmission of messages, in the form of packets, to and from the other end points via network link 150. According to one embodiment, a packet is a message which includes proximity information, an identifier of the source of the message (e.g., the source end point), and an identifier of the target of the message (e.g., the target end point). The initial message from a first end point to other end points indicating that the first end point is executing the group link application 230 is transferred via the datagram socket 375. Upon receipt of such a message, the receiving end point and the first end point establish a connection of transferring proximity information via the client and server sockets 365 and 370. Messages are transmitted from the client socket 365 and received by the server socket 370.

Figure 4:
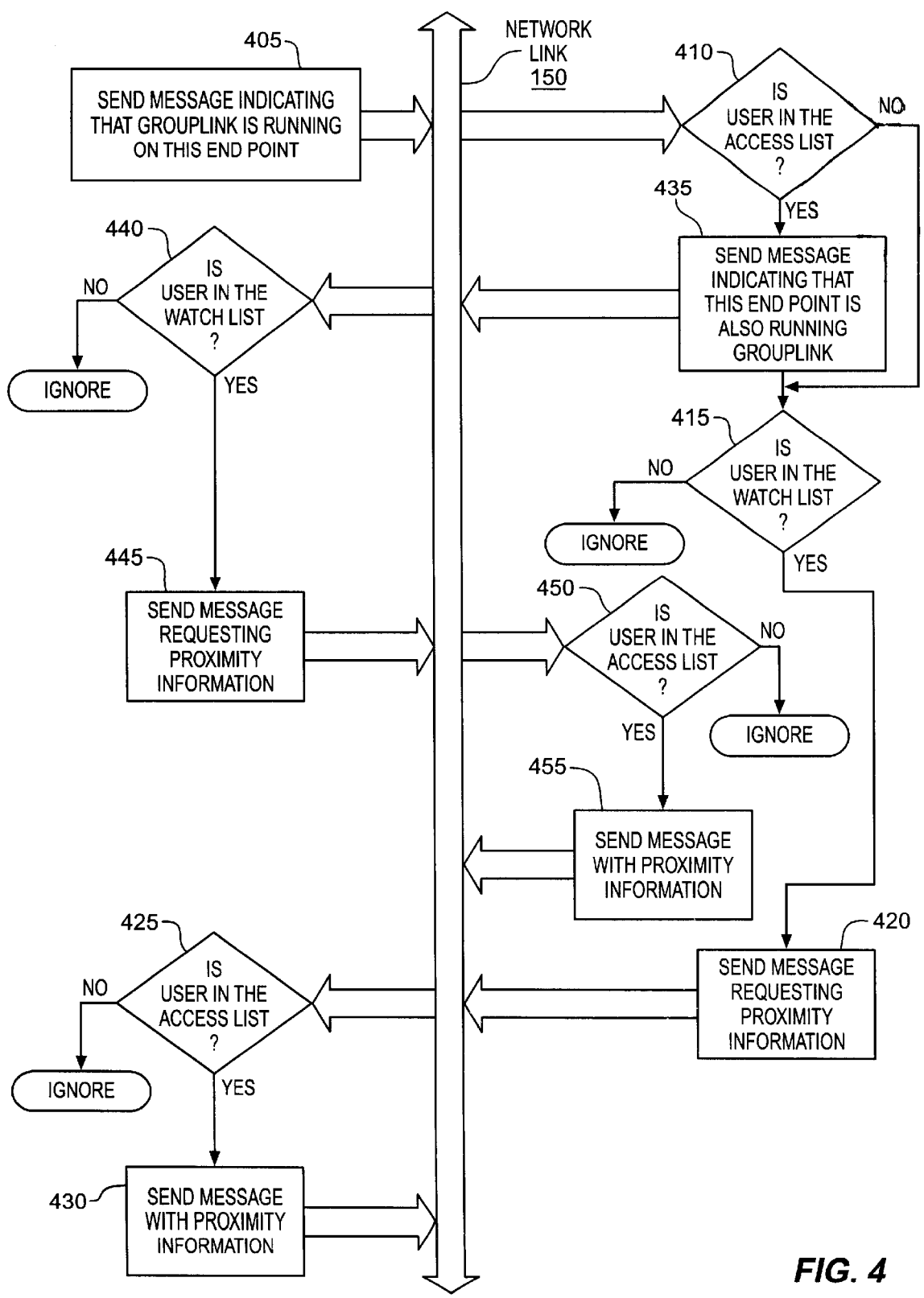
FIG. 4 is a diagram illustrating the startup messaging according to one embodiment of the present invention.

FIG. 4 is a diagram illustrating the startup messaging according to one embodiment of the present invention. In the discussion of FIG. 4, a first and second end point are referenced. However, it is to be appreciated that the grouplink application can be used with multiple end points, and is not limited to the interaction of two end points.

When a first end point begins running grouplink application 230, the first end point sends a message to the other end points coupled to network link 150 indicating that grouplink is running on the first end point, step 405. As illustrated the message is received by a second end point, which checks whether the first end point is in the second end point's access list, step 410. If the first end point is not in the second end point's access list, then the second end point checks whether the first end point is in the second end point's watch list, step 415. If not, then the first end point is ignored by the second end point. Proximity information regarding the user of the second end point (referred to as the second user) is not transferred to the first end point, and proximity information regarding the user of the first end point (referred to as the first user) is not displayed at the second end point.

However, if the first end point is in the second end point's watch list, step 415, then the second end point sends a message to the first end point requesting proximity information, step 420. This message is received by the first end point, which checks whether the second end point is in the first end point's access list, step 425. If not, then the message is ignored. However, if the second end point is in the first end point's access list, then the proximity information for the first user is sent to the second end point, step 430.

Returning to step 410, if the first end point is in the second end point's access list, then the second end point sends a message to the first end point indicating that the second end point is also running grouplink application 230, step 435. This message is received by the first end point, which checks whether the second end point is in the first end point's watch list, step 440. If not, then the second end point is ignored. No proximity information regarding the first end point is transferred to the second end point. However, if the second end point is in the first end point's watch list, then the first end point sends a message to the second end point requesting proximity information regarding the second user, step 445.

Upon receipt of this message from the first end point, the second end point checks whether the first end point is in the second end point's access list, step 450. If not, then the message is ignored. However, if the first end point is in the second end point's access list, then the second end point sends a message with the current proximity information regarding the second user to the first end point, step 455.

Figure 5:
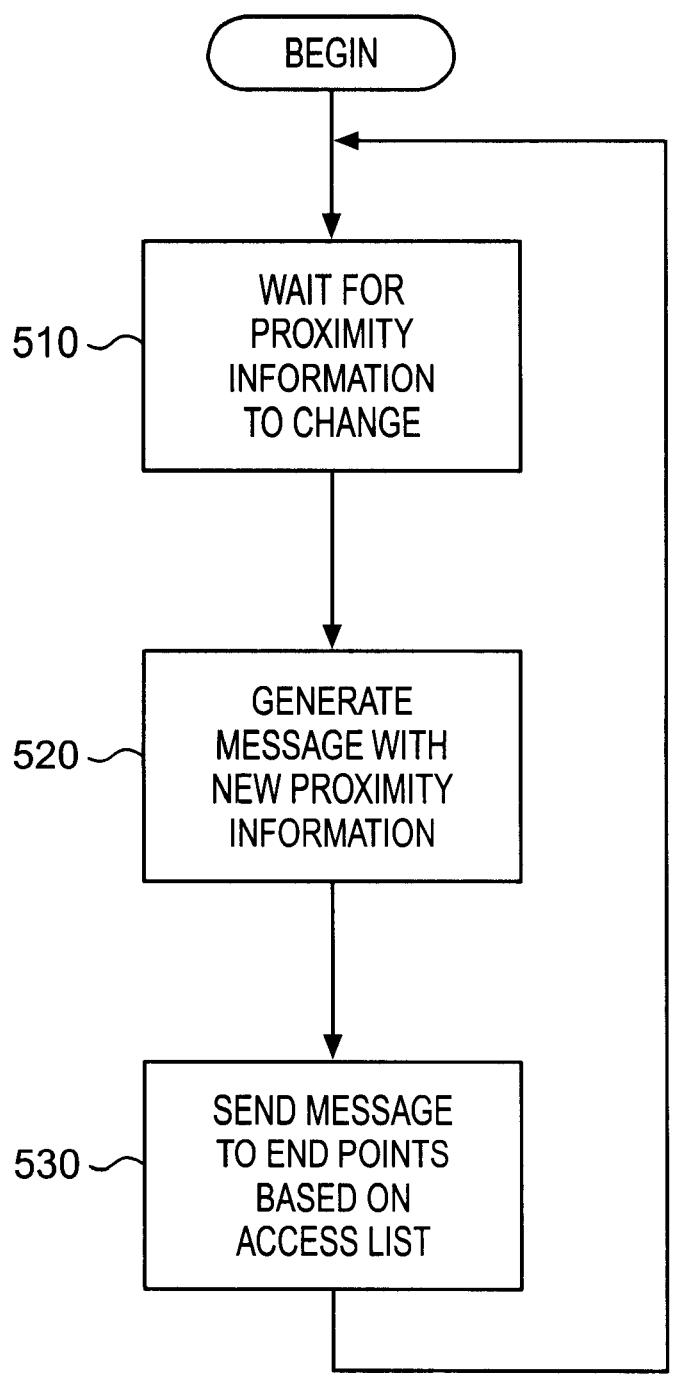
FIG. 5 is a flowchart illustrating the steps followed in continuing to provide proximity information by an end point according to one embodiment of the present invention.

FIG. 5 is a flowchart illustrating the steps followed in continuing to provide proximity information by an end point according to one embodiment of the present invention. Once grouplink application 230 is running and the startup messaging discussed in FIG. 4 has been completed, the first endpoint updates the other end points coupled to network link 150 with proximity information regarding the first user whenever the proximity information changes, as illustrated in FIG. 5. In this embodiment, packet manager 305 of FIG. 3 at the first end point receives the proximity information from status manager 325 for the first user and waits for the proximity information to change, step 510. If the proximity information changes, for example, proximity information changes from out to in, or in to out, or the probability that the first user is in close proximity to the end point changes, then packet manager 305 generates a message to other end points indicating this updated proximity, step 520. The packet manager sends a message to the other end points according to the access list, step 530.

Figure 6:
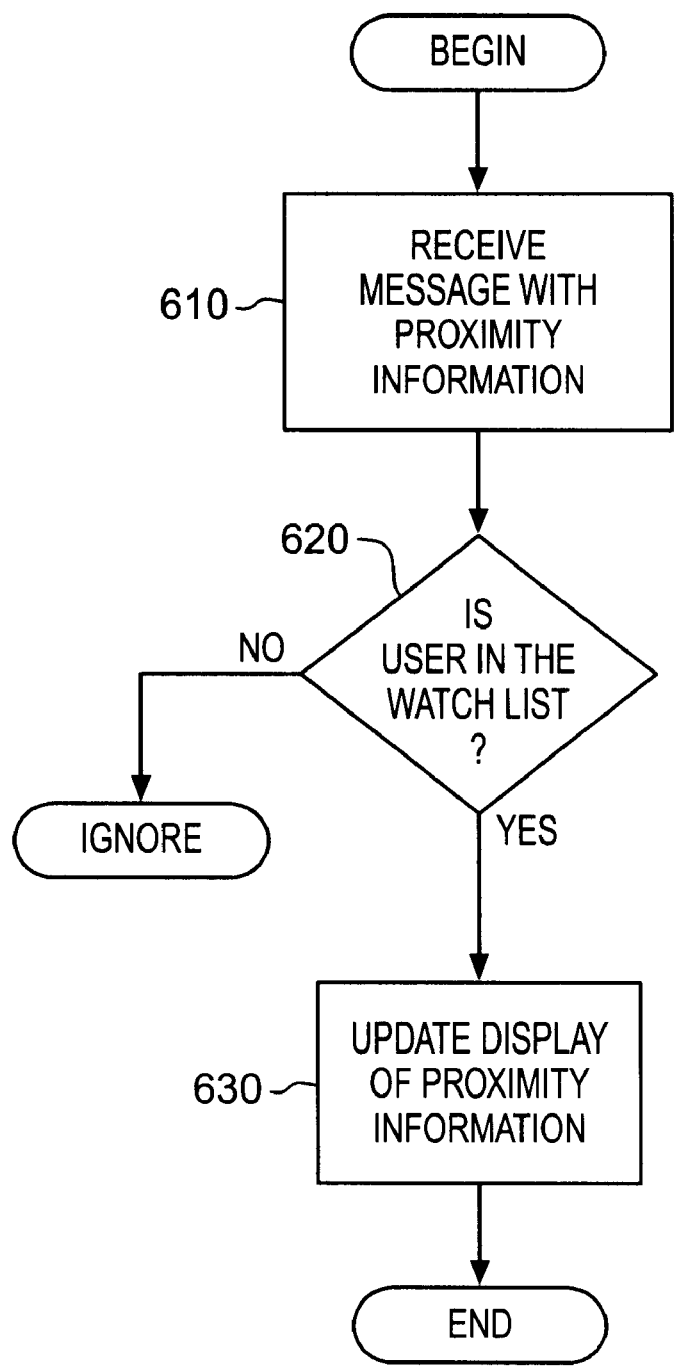
FIG. 6 is a flowchart illustrating the steps followed in continuing to receive proximity information by an end point according to one embodiment of the present invention.

FIG. 6 is a flowchart illustrating the steps followed in continuing to receive proximity information by an end point according to one embodiment of the present invention. The receiving end point compares the end point indicated in a received message, step 610, to watch list 350 of the receiving end point, step 620. If the sending end point is in watch list 350, then the proximity information for the user of the sending end point is updated at the second end point, step 630. Otherwise, if the sending end point is not on watch list 350, then the message is ignored by the receiving end point.

In the embodiments discussed above, the observee end point is discussed as periodically broadcasting a message indicating the current proximity of the observee end point to all observer end points. In an alternate embodiment, a polling process is used. In this alternate embodiment, the observer end point periodically sends a message to the observee end point requesting its current proximity information. In response to the message, the observee end point obtains the current proximity information from the decision maker and sends a message back to the observer end point with the current proximity information.

Figure 7A:
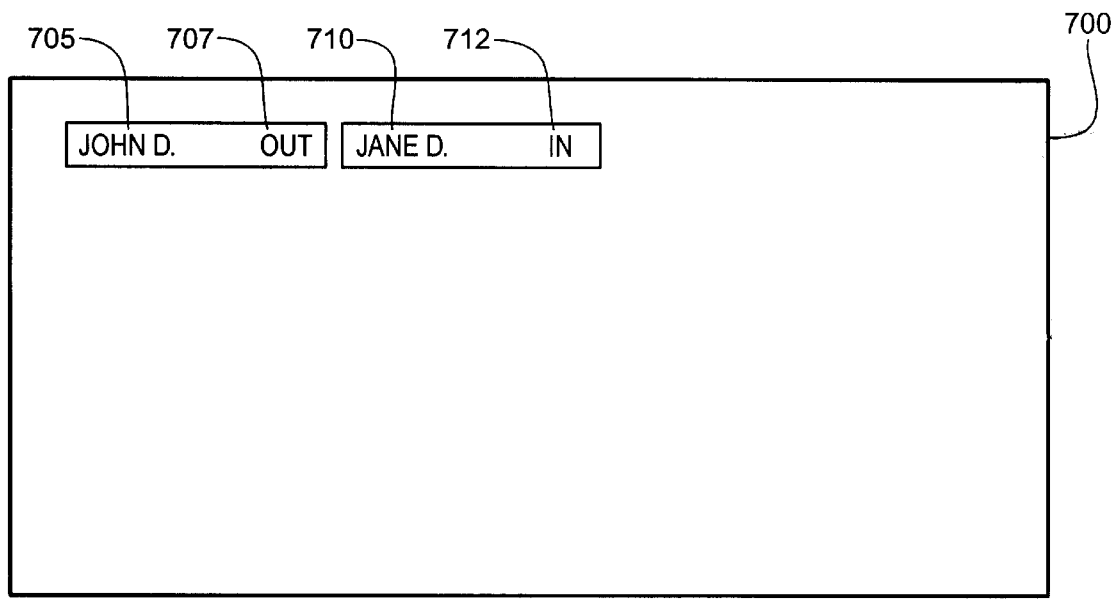
FIGS. 7a and 7b illustrate examples of displays of proximity information such as may be used with the present invention.
Figure 7B:
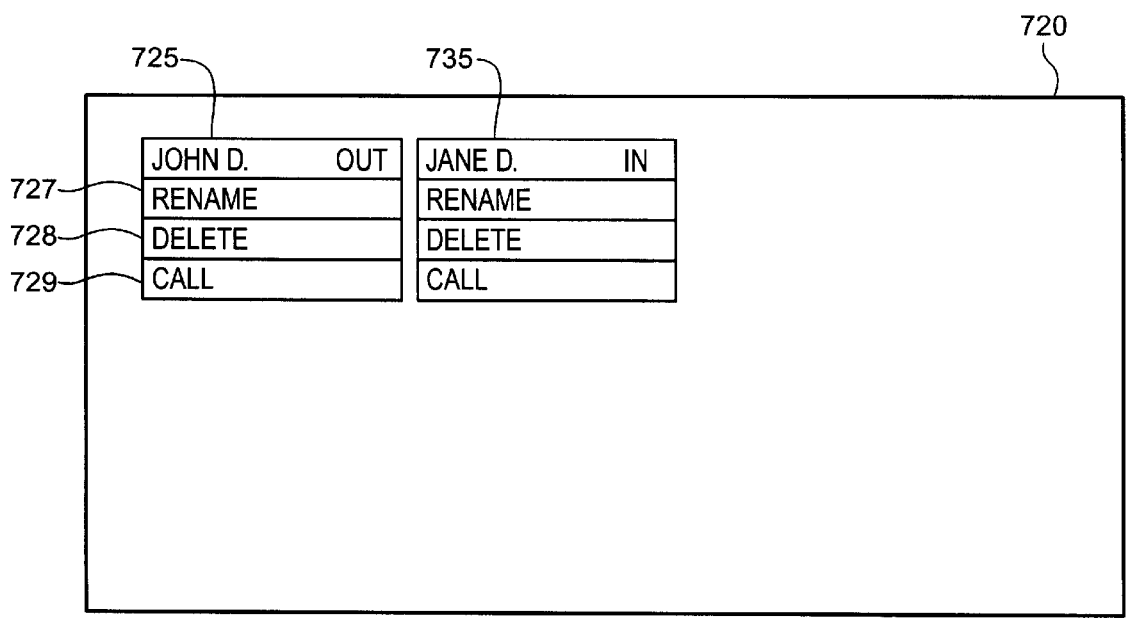

FIGS. 7a and 7b illustrate displays of proximity information such as may be used with the present invention. FIG. 7a illustrates a display 700 of an observer end point showing proximity information for two observee end points 705 and 710. The names of the users of the observee end points 705 and 710 are displayed, as well as an indication of whether each of the users is in close proximity to their respective end points. In one implementation, OUT 707 indicates the corresponding user is not in close proximity to his end point, and IN 712 indicates the corresponding user is in close proximity to her end point. An additional indication (not shown), such as a question mark, can be used to indicate that proximity information has not been received from the observee end point.

FIG. 7b illustrates a display 720 of an observer end point showing proximity information for two observee end points 725 and 735. Additionally, display 720 also provides the menu options of Rename 727, Delete 728, and Call 729. The Rename option 727 option allows the name of a user to be changed. The Delete option 728 removes the user from the watch list on the end point. The Call option 729 allows the user of the observer end point to call the corresponding observee end point. In one embodiment, if the Call option 729 is selected, the control logic of the group link application begins execution of ProShare™ conferencing software, thereby allowing a personal conferencing call with the observee end point to begin. It is to be appreciated, however, that other calling options can be used, such as other conferencing applications or a telephone call.

It is to be appreciated that a wide range of additional information and options can be provided via display 720. By way of example, an additional file transfer option could be added which allows the user to transfer a file to the observee end point by simply dragging the file on top of the name of the user of the observee end point. By way of another example, a notify option could be included which causes the grouplink application at the observer end point to notify the user of that end point when the proximity information for the observee end point changes. This notification can be, for example, an audio or visual alert. It is to be appreciated that a wide variety of additional information can be provided via display 720 within the spirit and scope of the present invention.

In an alternate embodiment of the present invention, additional group names can also be provided via display 720. By way of example, a group name could be provided in place of the individual names shown in FIGS. 7a and 7b. When the group name is selected by a user packet manager 305 of FIG. 3 provides the proximity information for all of the members of the group to grouplink people bar 360 for display.

Figure 8:
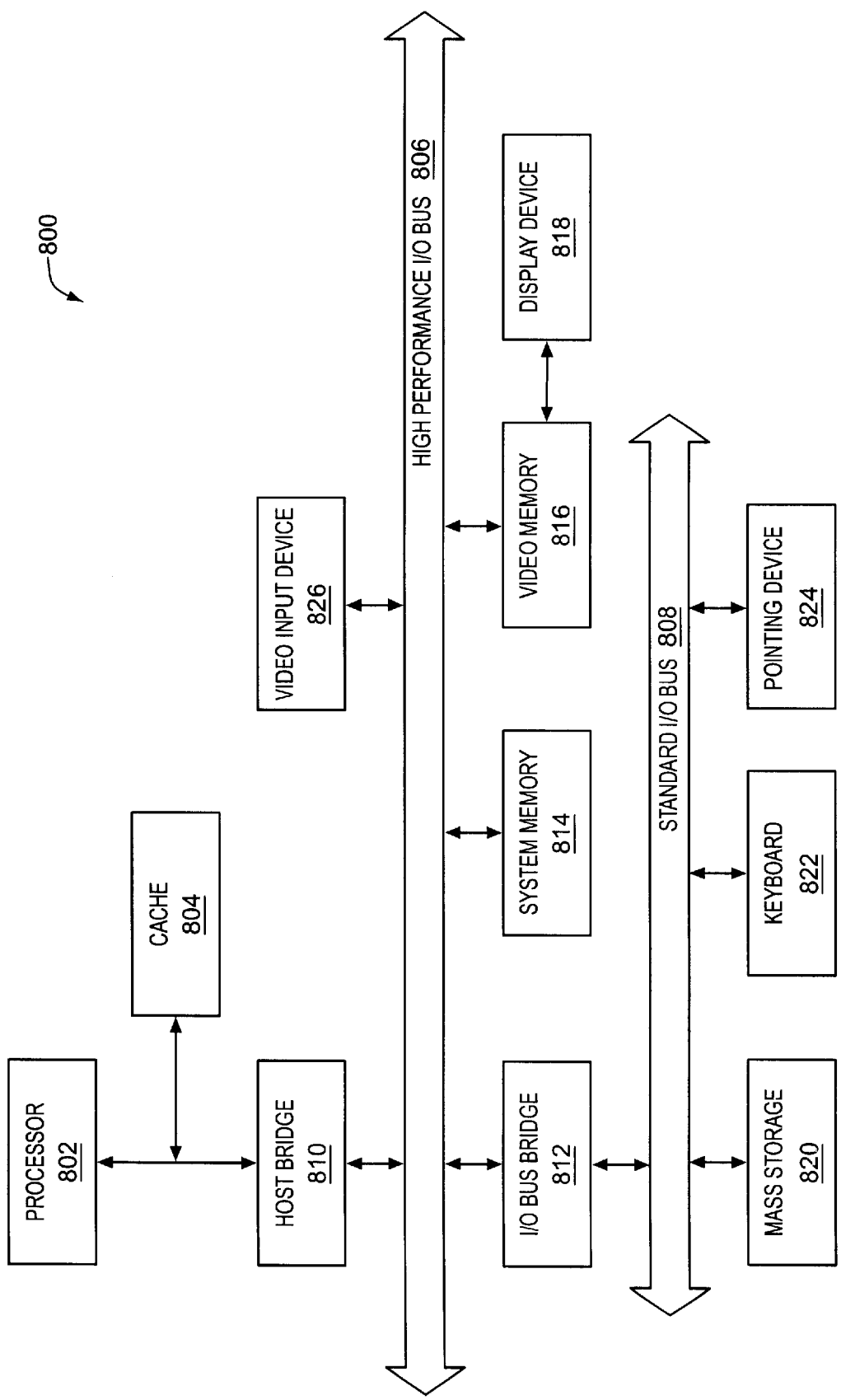
FIG. 8 illustrates one embodiment of a hardware system suitable for programming with the present invention.

FIG. 8 illustrates one embodiment of a hardware system suitable for programming with the present invention. As shown, for the illustrated embodiment, hardware system 800 includes processor 802 and cache memory 804 coupled to each other as illustrated. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are system memory 814 and video memory 816. In turn, display device 818 is coupled to video memory 816. Additionally, video input device 826, such as a ProShare™ camera, is also coupled to I/O bus 806. Coupled to bus 808 is mass storage 820, keyboard device 822, and pointing device 824.

These elements 802–826 perform their conventional functions known in the art. In particular, mass storage 820 is used to provide permanent storage for the programming instructions implementing the above described functions, whereas system memory 814 is used to provide temporary storage for the programming instructions when executed by processor 802. Mass storage 820 may be provided with the programming instructions by loading the programming instructions from a distribution storage medium (not shown), or by downloading the programming instructions from a server (not shown) coupled to hardware system 800 via a network/communication interface (not shown). Collectively, these elements are intended to represent a broad category of hardware systems, including but not limited to general purpose computer systems based on the Pentium® processor or Pentium® Pro processor, manufactured by Intel Corp. of Santa Clara, Calif.

In one embodiment, the mechanism for increasing awareness and sense of proximity among multiple individuals discussed above is implemented as a series of software routines run by the hardware system of FIG. 8. These software routines comprise a plurality or series of instructions to be executed by a processor in a hardware system, such as processor 802 of FIG. 8. Initially, the series of instructions are stored on a storage device, such as mass storage device 820. When the mechanism of the present invention is invoked, the instructions are copied from storage device 820 into memory 814, and then accessed and executed by processor 802. In one implementation, these software routines are written in the C++ programming language. It is to be appreciated, however, that these routines may be implemented in any of a wide variety of programming languages. In an alternate embodiment, the present invention is implemented in discrete hardware or firmware.

In one embodiment of the present invention, each time proximity information is received by the observer end point, the end point stores the proximity information and the time and date of the receipt of the proximity information. Thus, in this embodiment, the control logic of the observer end point maintains a time and date stamp record of the received proximity information. This information can then be accessed by a user of the observer end point as it is received, or alternatively at a later time.

Additionally, in one embodiment of the present invention, a manual override is provided to the user of an end point. This manual override can be provided in any of a wide variety of conventional manners, such as via an on-screen button, a command line input, a menu option, etc. Whether a manual override has been enabled, and if so the state of the override, is stored in user set properties 340 and is accessed by the control logic of the observee end point prior to the broadcast of the proximity information to the observer end point(s). The state of the override can be set, for example, to indicate the user is in close proximity to the end point or is not in close proximity to the end point. When the manual override is enabled, the control logic of the observee end point uses the manual input for the proximity information rather than that received from status manager 325. In one implementation, status manager 325 is disabled when a manual override has been enabled. Thus, by using the manual override, the user of the observee end point is able to force particular proximity information, as opposed to relying on status manager 325.

It is to be appreciated that a wide variety of additional options can also be provided to users via the present invention. By way of example, additional information could be broadcast by the observee end point if the decision maker indicates that a user is not in close proximity. This additional information could be, for example, a text message which can be customized by a user via user set properties 340 to indicate an expected time of return, another individual to contact, forwarding information regarding where the user is, whether the user has been in close proximity to the end point yet today, the last time the user logged into the end point, etc.

By way of another example, the group link application at the observee end point may provide an indication to the user of the observee end point that another system is establishing (or has already established) an observing connection.

The present invention is described above as using a combination of keyboard, cursor control device, and/or motion sensors to determine whether a user is in close proximity of the end point. However, it is to be appreciated that any of a wide range of conventional sensing devices can be used with the present invention. For example, a conventional infrared motion sensor or a pressure sensor placed in a chair or floor could be used. By way of additional examples, audio and/or voice sensing, heat sensing, other visual sensing devices such as photocells, etc. can also be used to determine whether a user is in close proximity to the end point. Additionally, other input devices could also be monitored analogous to the discussions above regarding keyboard and cursor control sensors. Examples of such additional input devices include touchscreens, drawing pads, digitizing equipment, etc.

Also in the discussions above, the present invention is described as broadcasting information to end points or polling end points for proximity information. It is to be appreciated, however, that the proximity information regarding the user of an end point can be communicated in any of a wide variety of conventional manners. For example, in one alternate embodiment, the proximity information is transferred to the user's web page (e.g., an HTML-compatible web page). Thus, in this alternate embodiment, the proximity information can be accessed by anyone by accessing the user's web page. In another alternate embodiment, multiple end points transfer their proximity information to the same "grouplink" web page. This web page can be accessed by other users at other end points to obtain information regarding the proximity of multiple individuals to their end points.

Thus the present invention provides a mechanism for increasing awareness and sense of proximity among multiple users. The present invention allows users to obtain proximity information regarding other members in their team, even though their team may be spread out over a large geographic area. Additionally, a wide range of options can be implemented with the present invention to provide customized information, based on individual user preferences.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, a mechanism for increasing awareness and sense of proximity among multiple users in a network system has been described.

What is claimed is:

1. A method comprising:
    maintaining a watch list for each of a plurality of network end points, each of the plurality of network end points associated with a particular user of a plurality of users, the watch lists each identifying network end points corresponding to those of the other users of the plurality of users, if any, whose proximity to their respective network end points is being monitored by the network end point associated with the watch list;
    maintaining an access list for each of the plurality of network end points, the access lists each identifying those of the other network end points, if any, that are authorized to receive proximity information associated with the user of the particular network end point;

each of the plurality of network end points operating as (1) an observer, (2) an observee, or (3) both an observer and an observee;

those of the plurality of network end points operating as observers periodically requesting user proximity information associated with those of the plurality of network end points included on their respective watch lists; and those of the plurality of network end points operating as observees periodically determining local proximity information regarding the proximity of their respective users and responding to requests received from the observers by providing the local proximity information only to those of the observers that are included in the access list of the observee.

2. The method of claim 1 further comprising executing a data-sharing application to share data between each of the plurality of network end points, the data-sharing application responsive to user proximity to the plurality of network end points.

3. The method of claim 1 further comprising executing a group link application to provide increased awareness and sense of the user proximity to the plurality of network end points.

4. The method of claim 1 further comprising providing a visual representation of the user proximity to the plurality of network end points by using a personal conferencing system, wherein the personal conferencing system having each of the plurality of network end points coupled to a video camera for capturing the proximity information.

5. A method comprising the steps of:

a step for maintaining a watch list for each of a plurality of network end points, each of the plurality of network end points associated with a particular user of a plurality of users, the watch lists each identifying network end points corresponding to those of the other users of the plurality of users, if any, whose proximity to their respective network end points is being monitored by the network end point associated with the watch list;

a step for maintaining an access list for each of the plurality of network end points, the access lists each identifying those of the other network end points, if any, that are authorized to receive proximity information associated with the user of the particular network end point;

a step for each of the plurality of network end points operating as (1) an observer, (2) an observee, or (3) both an observer and an observee;

a step for those of the plurality of network end points operating as observers periodically requesting user proximity information associated with those of the plurality of network end points included on their respective watch lists; and a step for those of the plurality of network end points operating as observees periodically determining local proximity information regarding the proximity of their respective users and responding to requests received from the observers by providing the local proximity information only to those of the observers that are included in the access list of the observee.

6. The method of claim 5 further comprising a step for executing a data-sharing application to share data between each of the plurality of network end points, the data-sharing application responsive to user proximity to the plurality of network end points.

7. The method of claim 5 further comprising a step for executing a group link application to provide increased awareness and sense of the user proximity to the plurality of network end points.

8. The method of claim 5 further comprising a step for providing a visual representation of the user proximity to the plurality of network end points by using a personal conferencing system, wherein the personal conferencing system having each of the plurality of network end points coupled to a video camera for capturing the proximity information.

9. A machine-readable medium having stored thereon data representing sequences of instructions, the sequences of instructions which, when executed by a processor, cause the processor to:

maintain a watch list for each of a plurality of network end points, each of the plurality of network end points associated with a particular user of a plurality of users, the watch lists each identifying network end points corresponding to those of the other users of the plurality of users, if any, whose proximity to their respective network end points is being monitored by the network end point associated with the watch list;

maintain an access list for each of the plurality of network end points, the access lists each identifying those of the other network end points, if any, that are authorized to receive proximity information associated with the user of the particular network end point;

each of the plurality of network end points operate as (1) an observer, (2) an observee, or (3) both an observer and an observee;

those of the plurality of network end points operating as observers periodically request user proximity information associated with those of the plurality of network end points included on their respective watch lists; and those of the plurality of network end points operating as observees periodically determine local proximity information regarding the proximity of their respective users and respond to requests received from the observers by providing the local proximity information only to those of the observers that are included in the access list of the observee.

10. The machine-readable medium of claim 9, wherein the sequence instructions which, when executed by the processor, further cause the processor to execute a data-sharing application to share data between each of the plurality of network end points, the data-sharing application responsive to user proximity to the plurality of network end points.

11. The machine-readable medium of claim 9, wherein the sequence instructions which, when executed by the processor, further cause the processor to execute a group link application to provide increased awareness and sense of the user proximity to the plurality of network end points.

12. The machine-readable medium of claim 9, wherein the sequence instructions which, when executed by the processor, further cause the processor to provide a visual representation of the user proximity to the plurality of network end points by using a personal conferencing system, wherein the personal conferencing system having each of the plurality of network end points coupled to a video camera for capturing the proximity information.

* * * * *